United States Patent
Lösl et al.

(10) Patent No.: US 9,324,037 B2
(45) Date of Patent: Apr. 26, 2016

(54) METHOD FOR MONITORING OF ROTATING MACHINES

(71) Applicant: Prüftechnik AG, Ismaning (DE)

(72) Inventors: Johann Lösl, Buch am Erlbach (DE); Edwin Becker, Moosinning (DE); Horst Göhlich, München (DE)

(73) Assignee: Prüftechnik Dieter Busch AG, Ismaning (DE)

( * ) Notice: Subject to any disclaimer, the term of this patent is extended or adjusted under 35 U.S.C. 154(b) by 241 days.

(21) Appl. No.: 13/959,923

(22) Filed: Aug. 6, 2013

(65) Prior Publication Data

US 2014/0046881 A1 Feb. 13, 2014

Related U.S. Application Data

(60) Provisional application No. 61/680,333, filed on Aug. 7, 2012.

(30) Foreign Application Priority Data

Aug. 7, 2012 (DE) .......... 10 2012 015 485

(51) Int. Cl.
*G06N 99/00* (2010.01)
*G05B 23/02* (2006.01)

(52) U.S. Cl.
CPC ............ *G06N 99/005* (2013.01); *G05B 23/021* (2013.01); *G05B 23/0245* (2013.01)

(58) Field of Classification Search
None
See application file for complete search history.

(56) References Cited

U.S. PATENT DOCUMENTS

| 6,314,413 B1 | 11/2001 | Otte |
| 6,321,216 B1 | 11/2001 | Otte et al. |

(Continued)

FOREIGN PATENT DOCUMENTS

| EP | 2 472 440 A1 | 7/2012 |
| WO | 2011/143531 A2 | 11/2011 |
| WO | WO 2011143531 A2 * | 11/2011 |

OTHER PUBLICATIONS

Walter, J., et al. "Rapid learning with parametrized self-organizing maps." Neurocomputing 12.2 (1996): 131-153.*

(Continued)

*Primary Examiner* — Kakali Chaki
*Assistant Examiner* — Eric Nilsson
(74) *Attorney, Agent, or Firm* — Roberts Mlotkowski Safran & Cole, PC; David S. Safran (57) ABSTRACT

Method for monitoring of a wind power plant operated in variable operating states. Start sensor data is obtained in at least one basic operating state of the machine; based on the start sensor data, a starting model with a rule set for conducting the monitoring is set up, the rule set determining which parameters are to be monitored, in which manner and with which weighting and which sensor data are to be obtained and used for this purpose; a reference SOM is prepared using the rule set with sensor data selected using the rule set and obtained in a reference operating phase of the machine; during a monitoring operating phase, time characteristics of a quantization error of the sensor data selected using the rule set being tracked with respect to the reference SOM, troubleshooting being started if the quantization error meets a criterion which is dictated by the rule set.

29 Claims, 6 Drawing Sheets

(56) References Cited

U.S. PATENT DOCUMENTS

| | | | |
|---|---|---|---|
| 6,591,199 B2 * | 7/2003 | Tremblay | C25B 15/02 702/35 |
| 7,464,063 B2 | 12/2008 | Vatchkov et al. | |
| 7,743,005 B2 * | 6/2010 | Vatchkov et al. | 706/16 |
| 7,778,947 B2 | 8/2010 | Hashimoto | |
| 7,865,333 B2 | 1/2011 | Becker | |
| 8,116,967 B2 | 2/2012 | Böttcher et al. | |
| 8,301,406 B2 | 10/2012 | Lee et al. | |
| 8,332,337 B2 | 12/2012 | Harrison et al. | |

OTHER PUBLICATIONS

Arabian-Hoseynabadi, H., et al. "Failure modes and effects analysis (FMEA) for wind turbines." International Journal of Electrical Power & Energy Systems 32.7 (2010): 817-824.*

* cited by examiner

METHOD FOR MONITORING OF ROTATING MACHINES

CROSS REFERENCE TO RELATED APPLICATION

This application claims the benefit of, and incorporates by reference, U.S. Provisional Patent Application No. 61/680,333, filed on Aug. 7, 2012.

BACKGROUND OF THE INVENTION

1. Field of the Invention

This invention relates to a method for monitoring of rotating machines, especially wind power plants, which are provided with a plurality of sensors for detection of physical parameters.

2. Description of Related Art

Vibration-diagnostic condition monitoring has been established for monitoring of mechanical components of rotating machines. Here, the vibrations of the individual components are continuously recorded as a quantity which describes the condition. The permanently measured data can be sent via online systems to a service center. This makes it possible to monitor a plurality of plants regardless of their locations. If conclusions about incipient component damage can be drawn from the measured vibration quantities, the operator of the plant is notified. He can then react promptly, depending on the type and severity of the damage.

In the case of a wind power plant, for example, due to the high complexity of the wind power plant as an overall construction, the analysis of vibration quantities is in part difficult. The plurality of effects and their mutual superposition make an unambiguous interpretation of the cause of the vibration with the conventional tools to some extent impossible. In addition, there is the problem that the rising number of plants to be monitored and the continued development of measurement systems toward seamless recording of states cause ever increasing amount of data.

Typically, in the condition monitoring of machines, a distinction is drawn between level 1, level 2, and level 3 operations, level 1 comprising the monitoring of measured values, for example, measured vibration values using predetermined threshold values, level 2 comprising a diagnosis, typically by an expert in a monitoring center, to answer the question "What damage is there?" and level 3 comprising an analysis of problems and fault causes.

A method which is often used in the condition monitoring of machines is called failure modes and effects analysis (FMEA), defined as a certain type of systematic procedure in the analysis of a system to determine possible failure modes, their causes and their effects on the system behavior. One example of the use of a FMEA method in the monitoring of a wind power plant (WEA) is described in German Patent Application DE 10 2008 006 370 A1 and corresponding U.S. Pat. No. 7,865,333 B2 for certain components of the wind power plant, certain characteristics being determined which arise as the product of certain index quantities, such as the frequency of the occurrence of a certain fault and the severity of the effect of this fault. These characteristics among others can be used in the evaluation of the diagnosis diagram, the current machine state and the risk of failure.

Furthermore, in the condition monitoring of machines statistical methods can be used in order to remove redundant information from the often very extensive measurement data sets by forming data clusters. One example of this is data processing using self-organizing maps (SOM); this was proposed for the first time by T. Kohonen in 1982.

International Patent Application Publication WO 2010/011918 A2 and corresponding U.S. Pat. No. 8,301,406 B2 describes level 1 monitoring of machines by the formation of SOM by means of tracking the time characteristic of the so-called quantization error of the SOM which has been formed. Furthermore, it is also mentioned that SOMs can also be used in the determination of the type of fault. U.S. Pat. No. 8,332,337 B2 also describes the use of SOMs in machine monitoring.

U.S. Pat. No. 7,778,947 B2 describes the monitoring of an air conditioning system by means of SOMs. U.S. Pat. No. 8,116,967 B2 describes the control of an internal combustion engine using SOMs. European Patent Application EP 0 845 720 A1 and corresponding U.S. Pat. No. 6,321,216 B1 and German Patent Application DE 197 34 947 A1 and corresponding U.S. Pat. No. 6,314,413 B1 describe the use of SOMs in the control of power plants, and it is also mentioned in European Patent Application EP 0 845 720 A1 and corresponding U.S. Pat. No. 6,321,216 B1 that the type of faults which occur in power plant operation can be determined from the evaluation of the patterns which arise in the SOMs.

European Patent Application EP 2 472 440 A1 describes the use of SOMs in the condition monitoring of production facilities, several different SOMs being proposed for different time bases and different space groups of the data which are delivered by the sensors; the different space groups can relate for example, to different plant parts.

In the article "Condition Monitoring: Adaptive Online Diagnosis Tool Optimizes Industrial Plants", by C. W. Frey et al., in "Intelligent Production", edition 2009 May, pages 38 to 39 the use of SOMs for industrial plants is described, plant monitoring by tracking of the quantization error using a so-called U-matrix representation for state classification being mentioned.

The article "A Process Monitoring System Based on the Kohonen Self-Organizing Maps" by S.-L. Jaemsa-Jounela et al., in "Control Engineering Practice" 11 (2003), pages 83 to 92 describes the use of SOMS in conjunction with heuristic rules for condition monitoring of plants, especially a copper smelting plant.

The article "Gear Box Condition Monitoring Using Self-Organizing Feature Maps" by G. Liao et al., in "Proceedings of the Institution of Mechanical Engineers", Part. C: Journal of Mechanical Engineering Science 2004, 218, pages 119 to 129, describes monitoring of a gear box by means of the visualization of the U-matrix of SOMs.

The article "Modified Self-Organizing Map for Automated Novelty Detection Applied to Vibration Signal Monitoring" by M. L. D. Wong et al., in "Mechanical Systems and Signal Processing" 20, 2006, pages 593 to 610, describes the monitoring of bearings by means of SOMs.

European Patent Application EP 1 640 894 A1 and corresponding U.S. Pat. No. 7,464,063 B2 and European Patent Application EP 1 777 601 A1 which corresponds to U.S. Pat. No. 7,743,005 B2 and the article "Real Time Classification Algorithm for Recognition of Machine Operating Modes and by Use of Self Organizing Maps" by G. Vachkov et al., in "Turk. J. Elec. Engin." 12, 2004, pages 27 to 42, describe the use of SOMs in the detection of the instantaneous operating state, for each known operating state its own SOM being set up.

International Patent Application Publication WO 2011/143531 A1 and the article "Wind Turbine Performance Assessment Easy—Multi Machine Modelling Approach" E. Lapira et al., in "Renewable Energy" 45, 2012, pages 86 to 95 describe the use of SOMs for condition monitoring in wind power plants, the quantization errors being evaluated in order to detect critical operating states.

SUMMARY OF THE INVENTION

A primary object of this invention is to devise a method for monitoring of a rotating machine, for example, a wind power plant, especially of a plurality of these machines, which efficiently and reliably recognizes fault states and also enables efficient classification of the faults.

This object is achieved in accordance with the invention by a method as described herein.

In the approach in accordance with the invention, it is advantageous that, by joining rule-based initial knowledge with respect to generally simple basic operating states which are already understood to statistical data reduction by means of SOMs, fault states of the machine can be recognized and evaluated especially efficiently and reliably. The use of a knowledge-based method for preparing a starting model with the rule set for conducting the monitoring ensures an appropriate and systematic selection of the parameters which are to be monitored by means of SOMs in addition to suitable weighting and an appropriate structure of the SOMs. The multistage procedure in SOM analysis, in which proceeding from a relatively comprehensive and thus "coarse" reference SOM, troubleshooting by means of rule-based establishment of more specific diagnosis SOMs is refined, contributes to efficient and still specific troubleshooting.

To the extent that a plurality of more or less similar machines are to be monitored, by cataloging the individual machines by assignment of a system characteristic relative to the type of components and/or the location, the initialization of the monitoring process can be made especially simple and efficient by the rule-based knowledge for the starting model or the reference SOM being adopted if the system characteristic of the pertinent machine is identical or relatively similar to another, already monitored machine.

The knowledge-based establishment of a starting model can take place, for example, using a FMEA method, using Markov graphs, using Petri networks or using a failure type analysis by means of a fault tree analysis (FTA) method. Preferably, a FMEA method is used.

Exemplary embodiments of the invention are explained in detail below with reference to the accompanying drawings by way of example.

DETAILED DESCRIPTION OF THE INVENTION

Figure 1:
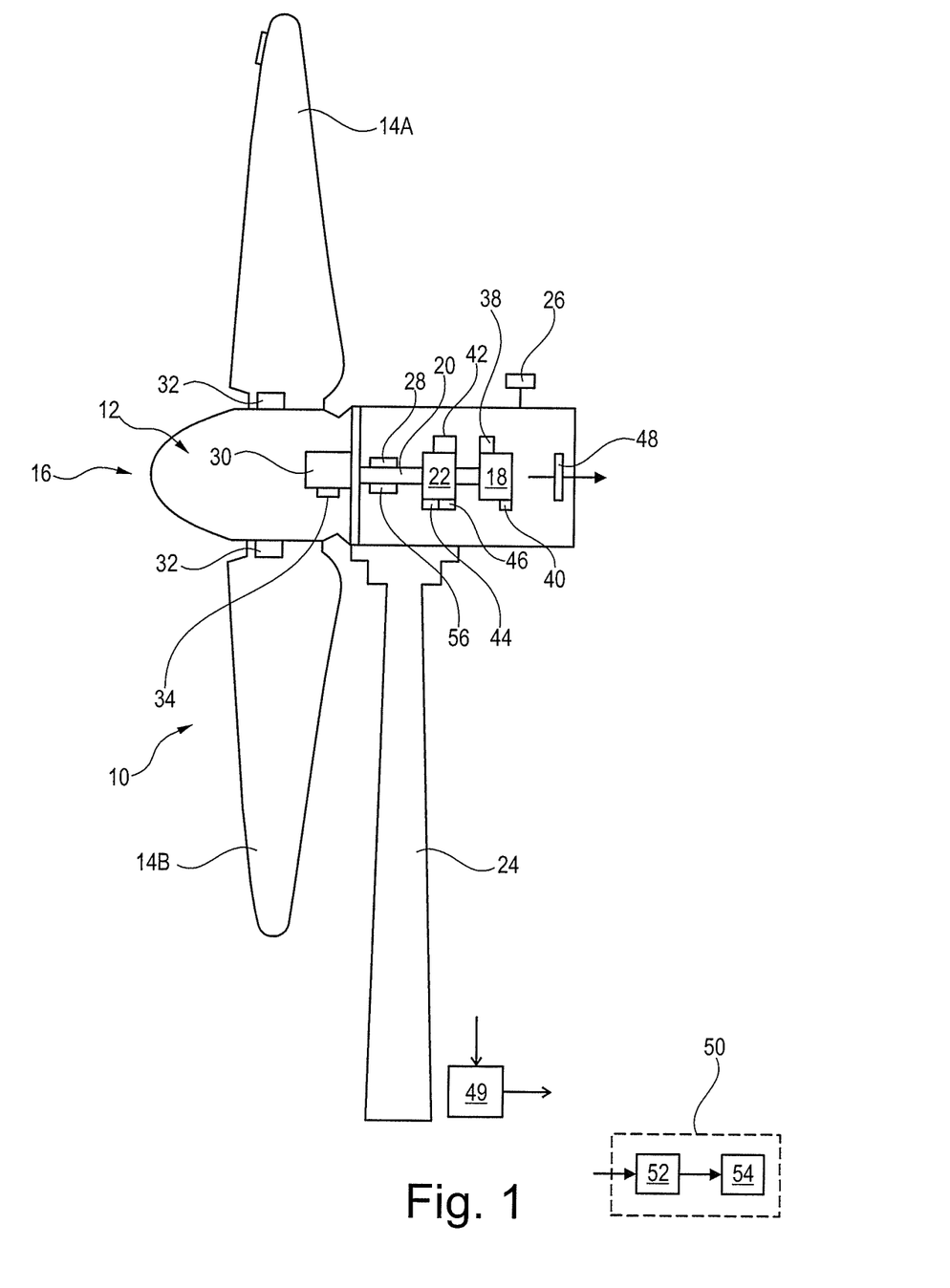
FIG. 1 shows a schematic view of a wind power plant.

FIG. 1 schematically shows a wind power plant which has a rotor 10 with a hub 12 for three rotor blades (of which FIG. 1 shows two rotor blades 14A, 14B). The rotor 10 is supported in a horizontal alignment in a gondola 16 which accommodates a generator 18 which is driven by the rotor shaft 20 for a gearbox 22. The gondola 16 is mounted on a tower 24 to be able to turn around a vertical axis and has a sensor 26 for measuring the wind speed and wind direction. Furthermore, there is a sensor 28 for detecting the rpm of the rotor 10.

The pitch of the rotor blades 14A, 14B can each be adjusted by means of a blade angle adjuster 32 around their longitudinal axis with respect to the hub 12 in order to implement pitch adjustment of the rotor blades 14A, 14B in a conventional manner.

Furthermore, for vibration-diagnostic condition monitoring of the wind power plant, there is a plurality of vibration sensors on the relevant plant components, for example, a horizontally measuring vibration sensor 34 on the main rotor bearing 36, a horizontally measuring vibration sensor 38 on the A side of the generator 18 (also called "DE" for Driving End) and another horizontally measuring vibration sensor 40 on the generator B side (also called "NDE" for "Non-Driving End"). Furthermore, the gearbox 22 is typically provided with several vibration sensors, for example, a horizontally measuring sensor 42 for the planetary stage of the gearbox, an axially measuring sensor 44 for the intermediate stage of the gearbox 22 and a vertically measuring sensor 46 for the output stage of the gearbox 22.

Typically, the vibration sensors are acceleration transducers with a linear characteristic in high frequency and also very low frequency ranges.

The data which have been acquired by the different sensors are collected in a data transfer apparatus 48 and transmitted to a data processing unit 49 on or in the vicinity of the wind power plant 10 and/or to a diagnosis site 50 which is located away from the wind power plant 10. The data processing unit 49 can also be connected upstream of a data transfer apparatus 48 in order to provide for preprocessing of the data which have been collected by the sensors before they are transmitted to the diagnosis site 50.

The diagnosis site typically comprises a data processing unit 52 for conditioning of the received data and a display means 54 for display of the conditioned data. The data are transferred to the diagnosis site 50 typically over the Internet. Especially in regions with poor Internet service, it is advantageous to undertake data preprocessing as extensive as possible before the data are transmitted to the diagnosis site 50.

Typically, a plant operator operates a plurality of wind power plants which can be of the same type or different types, and plants of the same type can be distinguished by the components used in the individual case, such as the type of generator and type of gearbox. Furthermore, the plants conventionally differ with respect to their location or with respect to their location conditions: for example, for operation of the plant, the relation to adjacent wind power plants, i.e., whether a certain wind plant is, for example, in a second row, the topography of the vicinity (for example, placement on an elevation or in a saddle) and vegetation and development of the vicinity play an important role. In order to specify or classify an individual plant with respect to its components and its location, preferably a plant characteristic for each wind power plant 10 is established which specifies at least one of the quantities gearbox type, converter type, rotor blade type, generator type and tower type and identifies the location of the plant with respect to the relation to the adjacent plants, the topography of the vicinity, and vegetation and development of the vicinity.

One difficulty in the analysis of vibrations of wind power plants is the superposition of many effects. Depending on the wind speed, incident wind flow angle, blade adjustment angle, etc. different superpositions of vibration excitations and transmissions arise. This means that different fault states are not always clearly depicted in the vibration spectra. As long as characteristic error frequencies arise, an existing fault can be assumed. However, if a fault frequency cannot be identified in the spectrum, this does not mean that there is no fault. Furthermore, a plurality of plants of different construction is represented on the market; this makes a uniform evaluation difficult. All this influences the vibration characteristics of the plant so that general conclusions about the vibration behavior of certain plants with conventional methods are difficult.

Another problem relates to the nature of the trend characteristics of wind power plants. The trend progression is likewise subjected to fluctuations by the fluctuations of the parameters. Thus, the warning or alarm boundaries are often exceeded without there being faulty plant behavior. For this purpose, there is level 1 monitoring, in any case the expenditure of effort at an increased occurrence of false alarms can rise greatly. Therefore, what is important is to avoid false alarms as much as possible. Data storage can also pose problems. In the monitoring of several hundred plants over a long time interval, the storage cost becomes higher and higher. This is promoted by the development of more powerful measurement systems which measure more rapidly and extensively. Likewise, data transfer can pose problems. Wind power plants are finding more and more access to the power supply of regions whose IT-technology infrastructure makes the continuous sending of large amounts of data difficult. Here, compressed data transmission is used without however cutting the quality of the monitoring too much.

Figure 2:
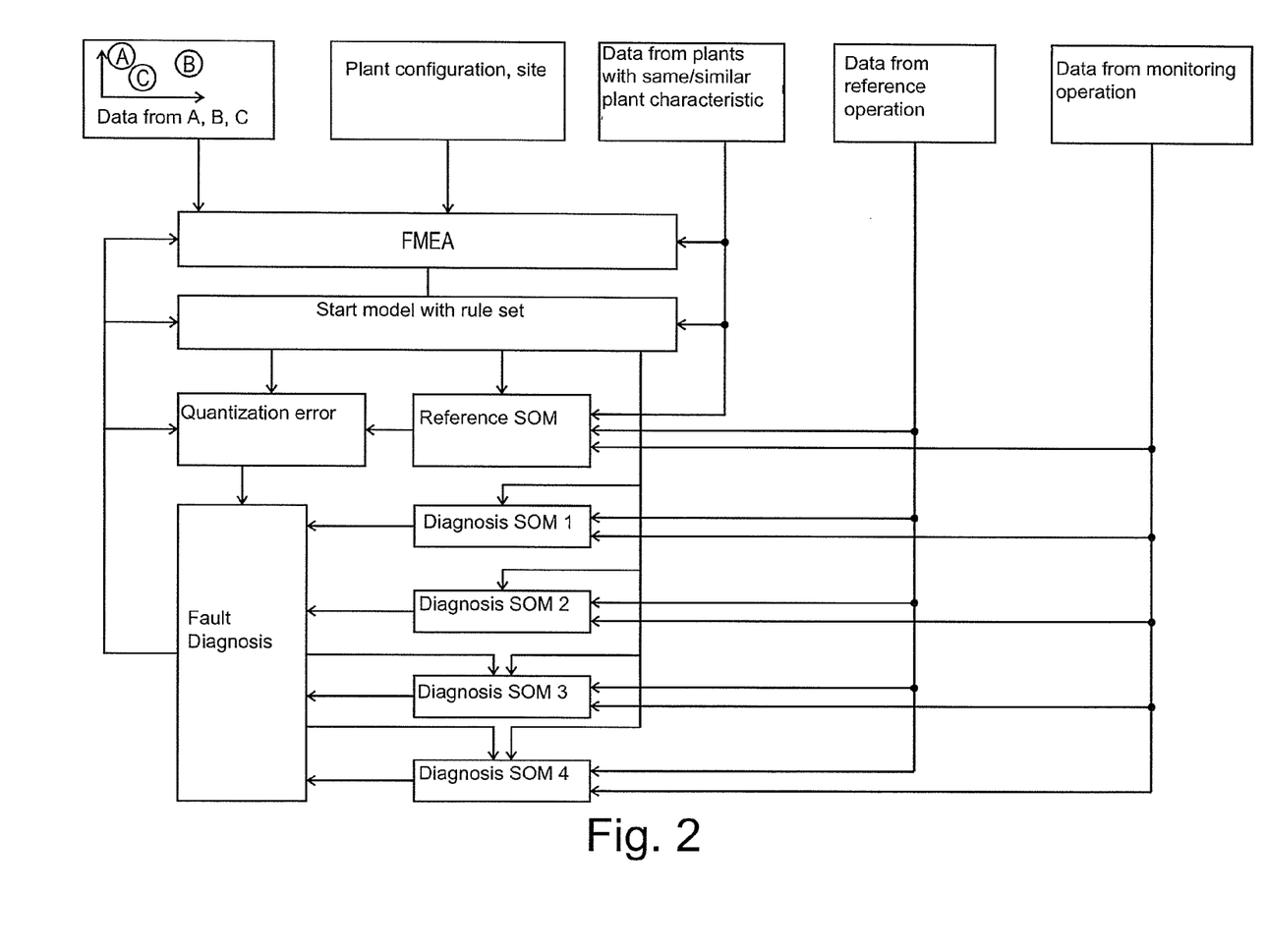
FIG. 2 shows a schematic diagram of one example of a monitoring method in accordance with the invention.

One example for the procedure in accordance with the invention, in the condition monitoring of a machine, for example, of the wind power plant 10, is shown in FIG. 2. In a first step, start sensor data in at least one basic operating state of the machine are obtained. Here, the limitation is to simple, easy to understand (typically quasi steady-state) operating states of the machine which to a certain extent represent "normal states"; in FIG. 2, these basic operating states are labeled A, B, and C in the diagram.

Based on the start sensor data, using a knowledge-based method, for example, a FMEA method, a starting model for the machine with a rule set for conducting the monitoring is then set up, the rule set determining which parameters are to be monitored in which manner and with which weighting and which sensor data are to be obtained and used for this purpose. In particular, the rule set also dictates how and with which data the SOMs to be used in condition monitoring are to be established.

In the establishment of the starting model, for example, at least one of the following quantities can be used (see also German Patent Application DE 10 2008 006 370 A1 and corresponding U.S. Pat. No. 7,865,333 B2 for further details:

a diagnosis priority number, which is the product of the following index quantity: the severity of the effect of the occurrence of a certain fault with respect to the serviceability of the machine, expected machine-specific follow-up costs when a fault occurs, and the possibility of fault correction;

a vibration priority number which results from the product of the following index quantities: the frequency with which a predetermined vibration boundary value is exceeded, the severity of the effect of exceeding the vibration boundary value with respect to the serviceability of the machine, and the probability of discovering the vibration boundary value being exceeded by means of the vibration detection system which is provided;

a risk priority number which results from the product of the following index quantities: the frequency with which the predetermined fault occurs in machine operation, the severity of the effect of the occurrence of a fault with respect to the serviceability of the machine, and the probability of discovering the occurrence of the fault by means of the diagnosis diagram used and the diagnosis system.

Here, the machine can be divided into several components, in the case of a wind power plant, for example, tower, main rotor bearing, generator, converter, gearbox, etc., and for each of the components, at least one of the aforementioned priority numbers can be determined.

Fundamentally, in the FMEA-based establishment of the starting model, the already existing information with respect to the machine relative to the occurrence of certain faults is incorporated in a rule-based manner into the condition monitoring in order to make the subsequent statistical data evaluation by means of SOMs especially efficient. By means of the statistical method, the operating states which are between the easily accessible and understood base states A, B, C will also be made accessible to fault analysis in order to improve the overall understanding of the plant.

If it is ascertained using the characteristic of the plant which is to be specifically monitored that a "similar" machine is already in operation and is being monitored, specifically when another plant has the same plant characteristic or the plant characteristic of the other plant differs by not more than a given value from the existing plant characteristic, the start sensor data or the starting model can be adopted with the rule set from this other plant, the identity or similarity of the plant characteristic ensuring that the two plants are actually relatively comparable to one another.

Fundamentally the SOM allows the representation of data of any dimension in two- or three-dimensional maps, the input space being defined by the data to be processed, for example, a data set with m variables and with n measurements. The individual data vectors using the vector distance computations and adjacency relationships are assigned to one coordinate in the output field which can be interpreted as a map, the output coordinates being numbered continuously. In order to enable data assignment, at the start a so-called weighting vector whose dimension corresponds to the number of m variables of the input data set is assigned to each coordinate. For assignment of a data vector to one coordinate of the SOM, the Euclidean distance between all weighting vectors of the SOM and the data vector is computed, the output coordinate whose weighting vector has the shortest distance to the data vector being called the "Best-Matching Unit" (BMU).

In training the SOM, the weighting vector of the BMU is matched to the respective data vector, the weighting vectors of the surrounding coordinates of the BMU to a certain degree being aligned to the data vector; this is determined by the adjacency function.

At this point, if a SOM has been trained with a data set which was obtained over a certain time interval of normal plant operation, the SOM which has been generated here can be regarded as a "reference-SOM" since it represents a normal state or reference state of the plant of some type.

The degree of deviation of the current data vector, i.e., of the current plant state, from the reference state can be estimated by the so-called quantization error which represents the Euclidean distance between the current data vector and the weighting vector of the BMU.

Visualization and analysis of different states or "phases" within the data set with which the SOM has been trained can take place by means of the representation of the so-called U-matrix (unified distance matrix) where, for each coordinate, the Euclidean distances of its weighting vector relative to those of its direct adjacent coordinates are represented and computed.

The information about the frequency of occurrence relative to states of the U-matrix can be depicted by means of the so-called hits matrix, for each coordinate it being described how many data vectors from the data set it represents.

With this invention, using the rule set of the starting model, sensor data are chosen which are obtained in a reference operating phase of the machine and are then used to prepare a reference SOM using the rule set. In this way, for example, it can be ensured that only those sensor data are evaluated which are critical or relevant to the machine which is to be monitored. Thus, in the case of a wind power plant, for example, it could result from the start sensor data and the FMEA method that the data of the sensor 44 are not relevant to the intermediate stage of the gearbox 22 since this intermediate stage never undergoes damage within the typical plant service life.

In the case of the wind power plant, for the reference SOM typically the wind speed and optionally the wind direction, rpm and output of the wind power plant as well as different vibration characteristics which have been measured at different locations are used.

Preferably, with this invention, the SOMs are manually or deterministically initialized such (i.e., the initial weighting vectors are chosen such) that the same operating states of the machine for all SOMs are located in the same (coordinate) regions of the SOMs (for example, such that the states of high rpm/output (full load) are always at top right and the states on shutdown are always at bottom right). This greatly facilitates the evaluation of the SOMs.

Preferably, a Gaussian function is chosen as the adjacency function.

Optionally, it can be necessary or appropriate to interpolate the sensor measurement data which are used for purposes of comparability to other measurement data in order, for example, to ensure a uniform time reference for all sensor measurement data.

Different parameters/variables within the data set can be weighted differently in the SOM so that a variable with a high weighting value will acquire a greater effect on the distance computations, as a result of which the error of these variables becomes lower and on the other hand the structure of the map is dominated more strongly by this variable. The weighting of the individual parameters arises based on the starting model.

Furthermore, in this invention preferably measured values which exceed a certain boundary value relative to an average of several measured values are not considered in the SOMs in order to avoid adulteration of the SOMs by "amplitude outliers" in the measurement data, as can be produced for example, by inattentive technicians, bird strike, sensor faults or the like. For example, an average of the hundred highest amplitudes can be computed and then all measurement data whose value exceeds a value of "0.8×average" are removed from the data set.

If, among the monitored machines, there is one with a relatively similar or identical plant characteristic, in addition to adopting the starting model, the reference SOM can also be similarly adopted.

The reference SOM to a certain extent constitutes the starting point for the monitoring of the operation of the machine with respect to the occurrence of faults and should therefore represent essentially the normal state or the undisturbed operation of the machine ("good condition"). During a monitoring operating phase of the machine, the time characteristic of the quantization error of sensor data which have been selected using the rule set is tracked with respect to the reference SOM, i.e., the data vector which corresponds to the current measured values is compared to the weighting vector of the BMU, the deviation, i.e., the quantization error, generally representing a good measure for the deviation of the instantaneous plant state from the normal state. Typically, all parameters taken into the reference SOM are tracked. As soon as the quantization error satisfies the criterion which is dictated by a rule set, therefore for example, exceeds a certain given threshold value, troubleshooting is started since it is then assumed that there is such a great deviation of the instantaneous plant state from the normal state that it is probable that there is a fault (for example, excess wear of a component) (in this sense the reference SOM acts as a "level 1 SOM").

Typically, in this case, an alarm is also transmitted to the diagnosis site 50.

In the reference SOM. since all parameters of the system which are somehow relevant are recorded, using the quantization error, it can be ascertained with respect to the reference SOM that there is a fault somewhere in the system, but it cannot generally be ascertained in detail where the fault lies or what kind of fault is present.

For this purpose, using the rule set, at least one first "diagnosis-SOM" (or "level 2-SOM"; in the example from FIG. 2 called "diagnosis SOM 1" and "diagnosis SOM 2") with a subset of the sensor data obtained in the monitoring operating phase, is prepared which is evaluated using the rule set in order to identify a fault cause. The subset can be formed with respect to the measurement instants and/or the number of sensors, i.e., in the diagnosis SOM only some of the measurement instants and/or some of the sensors are considered. For example, it can result from the FMEA that a certain component of the machine is especially critical with respect to fault susceptibility so that then mainly this component is analyzed in detail by means of a correspondingly established diagnosis SOM. Typically, corresponding subsets of the sensor data which have been obtained in the reference operating phase will also be incorporated into the diagnosis SOM in order to take the corresponding "good condition" information into the diagnosis SOM at the same time.

The evaluation of the diagnosis SOM comprises the preparation of at least one 3D graph of the diagnosis SOM; in these 3D representations one of the parameters considered in the diagnosis SOM (for example, the vibration amplitude which has been measured by the main rotor bearing sensor) at a time is plotted for each coordinate of the SOM, for certain fault types generally typical SOM pictures arising so that a certain fault can be relatively easily recognized and assigned. The 3D graphs are typically evaluated by a corresponding specialist at the diagnosis site, and corresponding automatic image processing, for example, with automatic pattern recognition, can be used in support.

To better recognize deviations in the monitoring operating phase for the evaluation of the troubleshooting of the SOM, a good condition SOM which corresponds to the respective diagnosis SOM can be established with sensor data which have been obtained during the reference operating phase of the machine and a 3D graph of the good condition SOM can be prepared for purposes of comparison to the 3D graph of the diagnosis SOM using the rule set. In the evaluation of the diagnosis SOM, for the respective diagnosis SOM, its own 3D graph can be prepared for at least two parameters which are contained in the diagnosis SOM, these parameters being selected based on the rule set, i.e., typically, the parameters which are especially fault-critical according to FMEA will be examined in detail.

Fundamentally, in the selection of the diagnosis SOM, i.e., in the decision about which type of diagnosis SOM is examined first in detail, its quantization error can be considered, i.e., for example, first of all, that diagnosis SOM is selected whose quantization error (with respect to the current data vector) is especially large since a large quantization error is conventionally an indication of the presence of a fault. For example, this SOM can be chosen as the diagnosis SOM whose quantization error is above a certain threshold value.

Fundamentally, difference-3D representations can also be formed and evaluated, for example, a diagnosis SOM being removed from the corresponding good condition SOM.

Preferably, for the preparation of the diagnosis SOM, at least part of the sensor data is subdivided using the rule set into at least two frequency bands (for example, the FMEA can result in that certain faults of certain component in certain frequency bands can be especially easily recognized). The diagnosis SOMs can be distinguished with respect to the selected frequency band of the data at least of one of the sensors. Thus, for example, it can be useful to establish, for a certain vibration sensor, several diagnosis SOMs which differ with respect to the frequency band which has been considered.

If the identification of a fault cause from the evaluation of the first diagnosis SOM(s) is not successful, at least a second diagnosis SOM (in the example from FIG. 2 called "diagnosis SOM 3" and "diagnosis SOM 4") with another subset of the sensor data obtained in the monitoring operating phase is prepared and evaluated in order to identify a fault cause. In this way, troubleshooting can be made especially efficient: Using the evaluation rules obtained from the FMEA, for example, first the most frequent fault or the fault which is most critical with respect to its effect is sought by a first diagnosis SOM being established which represents this fault especially well (or optionally several such first diagnosis SOMs). But, if there is another fault, in this procedure, from this first diagnosis SOM(s), an unambiguous fault cause cannot be identified so that then, for example, the second most frequent or second most critical fault is specifically sought by a corresponding (or several corresponding) second diagnosis SOM being established. The incremental procedure is continued until an unambiguous fault cause can be identified.

Since, on the one hand, in the course of the monitoring operating phase additional sensor data and thus information about the machine arise (i.e., compared to the reference operating phase), and on the other hand, additional findings about the operating behavior of the machine are also obtained in troubleshooting or fault identification, it is appropriate to check and optionally modify the starting model, and thus, the rule set using evaluations of the reference SOM and/or the diagnosis SOMs. In this way, in the course of operating the machine, optimization of the condition monitoring can be achieved, and especially the starting model can be more and more refined over time.

A starting model which has been modified or improved in this way can then also be made available to other wind power plants which are relatively comparable to this plant, i.e., have an identical or relatively similar plant characteristic, and also a reference SOM with sensor data obtained in the monitoring operating phase added can be made available as the reference SOM for other similar plants.

Here, it can also be especially appropriate to modify the reference SOM with at least one part of the sensor data which have been obtained during the monitoring operation phase in order to match the reference SOM to changes of the plant state; this is useful, for example, when a permanent alarm (in the form of an overly large quantization error) based on the operation-dictated deterioration of a component is to be avoided, i.e., the degraded plant state is then established as a new "good condition".

Mainly in cases in which the long-distance data transmission to the diagnosis site 50 is limited in some form, it is appropriate to prepare the SOMs locally on site in the data processing system 49 in or in the vicinity of the machine to be monitored, and then to transmit only the data contained in the SOMs by means of long-distance data transmission to the diagnosis site 50 in order to achieve a reduction of the transmitted data compared to the sensor data which have been obtained locally on site. But, it is recommended that the acquired sensor data be stored on site in order to enable the retrospective preparation of different diagnosis SOM on site.

Figure 3:
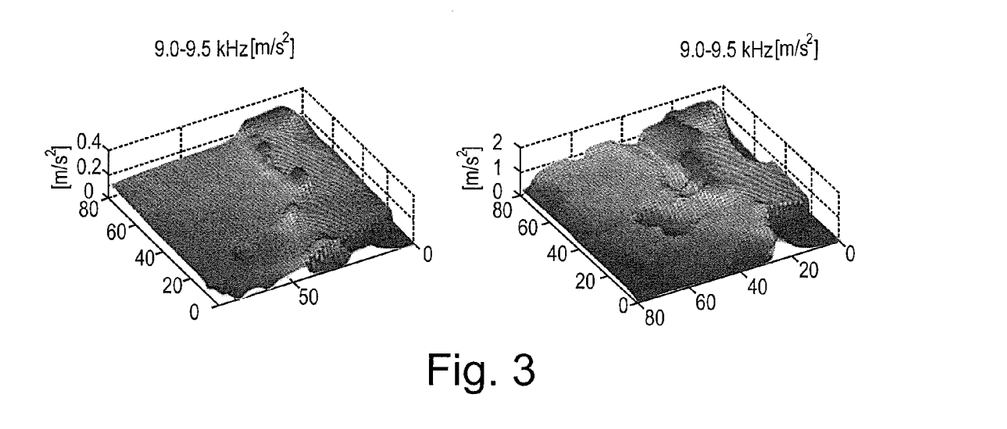
FIGS. 3 to 11 show different examples of 3D representations of SOMs which have been obtained in practice.

FIG. 3 shows examples for SOM graphs in a 3D representation of the acceleration characteristics in the frequency band from 9 to 9.5 kHz of the vibration transducer on the generator B side of a wind power plant in the good condition (on the left) and with generator damage (on the right). Here, it is apparent that the generator damage has a serious effect on this vibration characteristic in this frequency range.

Figure 4:
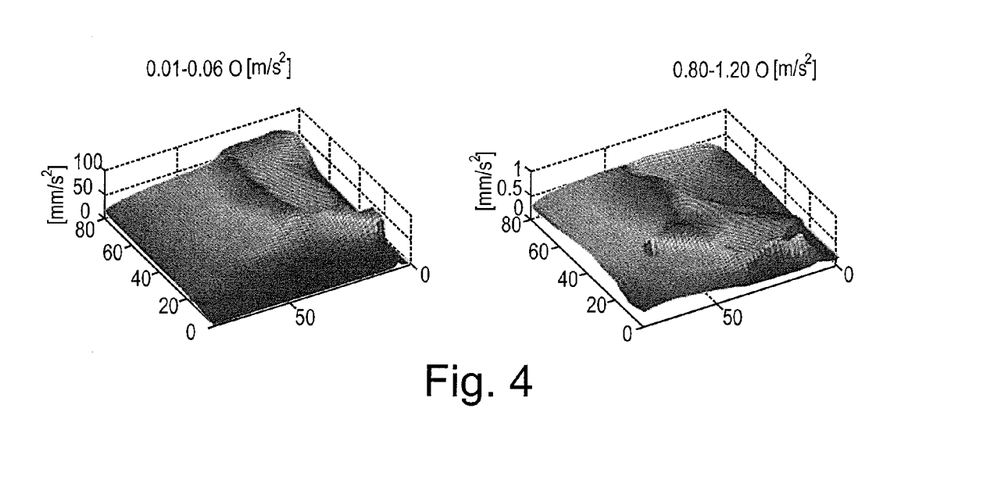

FIG. 4 shows 3D representations of SOMs of the vibration characteristic on the main rotor bearing of a wind power plant for a low frequency evaluation (0.01 to 0.06 order at left) or for a higher frequency evaluation (0.8 to 1.20 order) with the tooth frequency of the planetary stage (at right). Here, it is apparent that most turbulence-induced vibration impacts act in the middle wind range while the effects on the planetary teeth are however relatively small.

Figure 5:
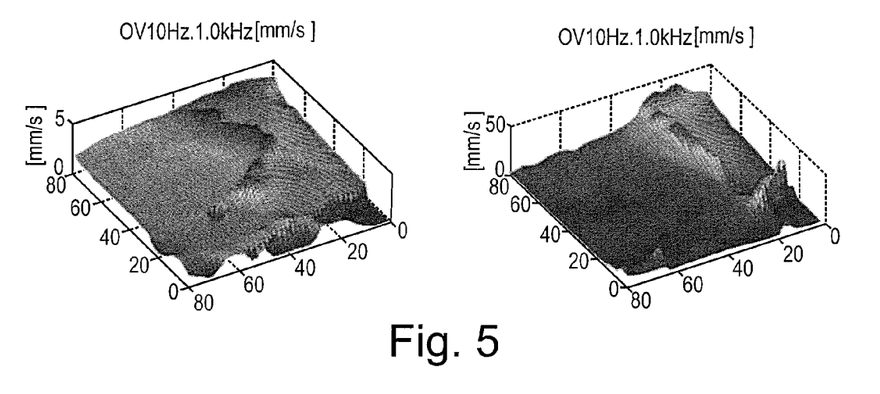
Figure 6:
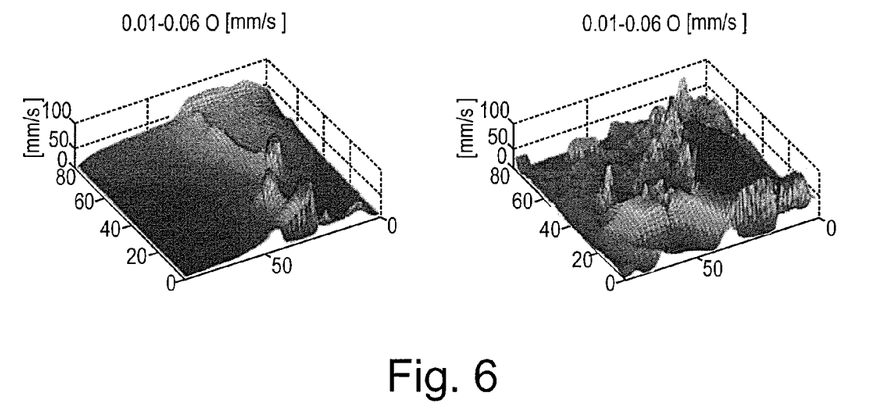
Figure 7:
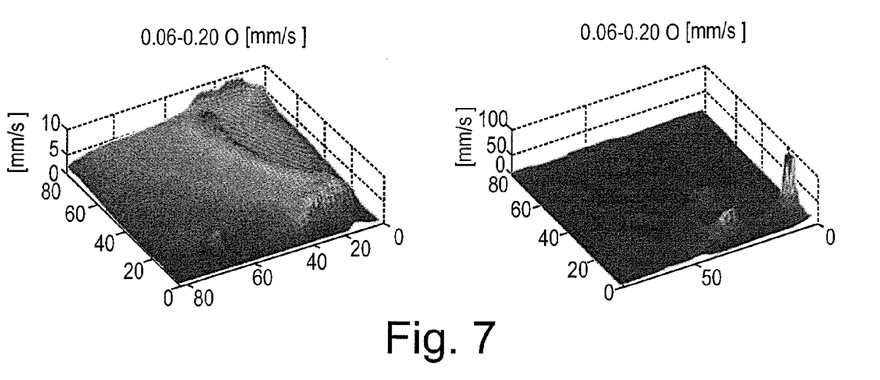
Figure 8:
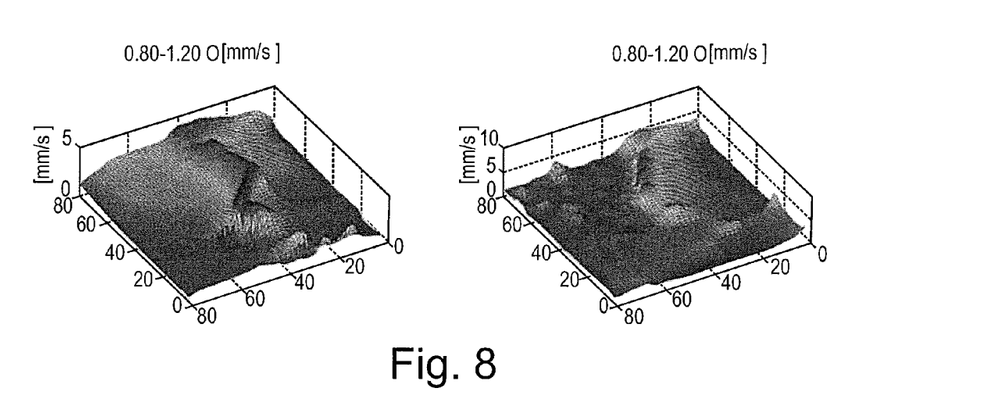
Figure 9:
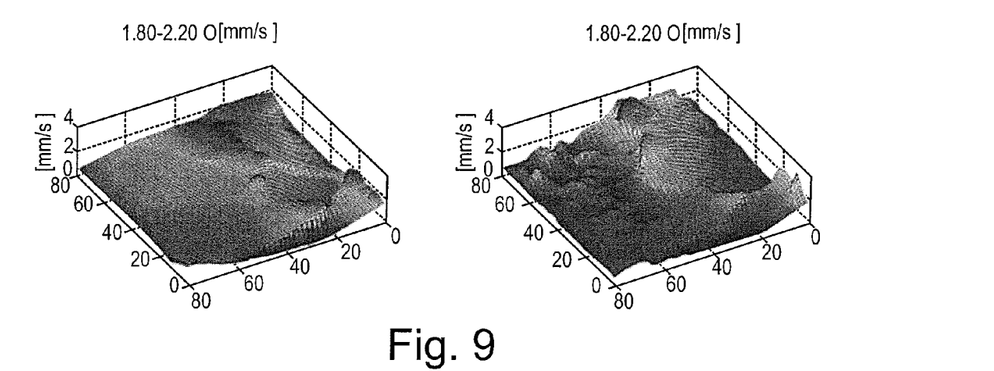

FIGS. 5 to 9 show 3D representations of SOMs of the vibration characteristics on the main rotor bearing of a wind power plant for different frequency ranges (FIG. 5: 10 Hz to 1 kHz; FIG. 6: 0.01 to 0.06 order; FIG. 7: 0.06 to 0.20 order; FIG. 8: 0.08 to 1.20 order; and FIG. 9: 1.80 to 2.20 order), to the left the good conditions being shown and to the right the condition after generator damage.

Preferably, the WEA [wind power plant] is equipped with a system which makes it possible to detect changes in wind speed and wind direction before hitting the WEA (and the sensor which is attached there) so that the WEA can react proactively to these changes, for example, by corresponding pitch adjustment. Thus, the WEA can react optimally to incoming gusts in order to optimize the energy yield and to minimize the loading of the WEA components (when the gust is striking the WEA it is generally too late for corrections). This anticipatory detection of the wind can take place, for example, by means of LIDAR (light detection and ranging) systems. For example, the wind can be measured at a distance of 80 m from the plant; this yields a reaction time of 4 seconds at a wind speed of 20 m/s. The effectiveness of this proactive control can be monitored by means of the SOM analysis techniques which have been described here.

This invention combines the conventionally rule-based analysis of the plant state with a special statistical data evaluation by means of SOMs, as a result of which a massive data reduction is enabled by the elimination of redundant information. The rule-based analysis by means of FMEA is designed essentially to direct the "viewing angle" of the statistical evaluation at the correct article, as a result of which the efficiency and reliability of the statistical evaluation are greatly improved. Furthermore, by corresponding feed of the progress of findings from the statistical analysis into the rule-based analysis the rule-based analysis can be improved with increasing length of plant operation.

For level 1 analysis, first, a relatively global quantization error into which all or almost all measured parameters are incorporated is used in order to recognize the occurrence of a fault. In the following level 2 analysis the already existing rule-based knowledge is used in order to find the cause of the fault by means of SOM evaluation in a manner as efficient and simple as possible. Although generally in this connection the aid of a trained level 2 specialist will be necessary, the work can be facilitated for the specialist in that, for different plants of the same type, the same fault causes the same topological change in the SOM, and therefore, can be easily recognized by simple examination of the 3D representations of the SOMs if the same fault has already occurred once in the existing plant or in a plant of the same type. The data reduction which accompanies the statistical evaluation, for example, allows the implementation of very rapid measurement sequences, as a result of which in the case of a wind power plant even short-term, turbulence-induced vibration excitations can be recognized and analyzed.

Fundamentally, the use of the upstream FMEA makes it possible to define the SOM graphs which are "correct" in a manner specific to the plant and specific to operation in level 2 analysis in order to work with characteristics which describe the "correct" fault.

For prompt measurement of the individual parameters at the same time, not only turbulence phenomena, but also phenomena which occur in the transition between the different plant operating states such as, for example, in the running-up of the plant, can be treated and analyzed by trajectories in the SOMs being detected and assigned to the corresponding state, for example, running-up or running-down of the plant. In this way, for example, resonance tracking is enabled, such as, for example, a plant during run-up travels through different frequencies to a resonant frequency of one component.

With respect to the frequency band-oriented SOM analysis of a wind power plant, it can be appropriate, for example, to subdivide the signal of the vibration sensors into the four following frequency ranges: (1) 0 to 10 Hz are the low frequency vibrations of the tower, gondola and blades, therefore structural vibrations; (2) 10 Hz to 1 kHz are the middle frequency vibrations which arise as a result of the plant alignment; (3) 1 kHz to 30 kHz are the high frequency vibrations of gearboxes and bearings (caused by components such as bearing rings, rolling elements and gears); (4) 30 kHz to 200 kHz are frequencies which can be used in early damage detection by means of shock pulse, SWAN (stress wave analysis) or AE (acoustic emission); they are vibrations in the region of the transmitter resonant frequencies.

The operating quantities wind speed, generator output and rpm are continuously measured as simultaneously as possible in the self-contained or integrated CMS with an adapted measurement rate. With these measurement quantities, for example, the power and speed characteristics of the individual WEA can be determined two-dimensionally and compared to the theoretical state. If ten-minute averages are compared, this corresponds to the static power characteristics of the WEA, if one-minute averages are compared, to the dynamic (for example, turbulence-dictated) power characteristics, and if second values are compared, for example, effects which are subject to play can be evaluated. Or the behavior of the WEA is evaluated in trends over weeks, months and years and the process variables are monitored for changes.

Therefore, at least part of the sensor data is averaged in a time reference and a diagnosis SOM is prepared with the values which have been averaged over time. Preferably, the sensor data are averaged in several different time references (for example, one-minute and ten-minute), for each reference a separate diagnosis SOM being prepared and the diagnosis SOMs which have been prepared in this way being compared to a diagnosis SOM which has been prepared based on corresponding unaveraged sensor data (which have been obtained for example, on the basis of seconds).

If SOM graphs of the operation-relevant measured quantities of the WEA are used, the ambient and operating behavior of the WEA can be very promptly documented "at a glance" and also that of adjacent WEA can be compared among one another. If deviations occur or altered SOM graphs appear, "disruptive influences" can be delineated and the specialist can analyze the causes in a dedicated manner in his conventional knowledge-based diagnosis.

Parameterization, resolution, scaling and representation of the SOM graphs are established by means of FMEA referenced to the machine and application and are left the same for comparable plants and phenomena. This then allows the comparison of similar machines and plants or enables data reduction, checking of the data quality and/or simplified modeling in a relatively simple manner. The interfaces in the U-matrix can also be identified and for transient state trajectories can be computed for identification of the phenomena. SOM graphs can be produced daily, weekly, monthly, added up and/or analyzed with respect to changes.

The operating and process behavior can be described "at a glance". If then the frequency distributions are also included, service life estimates and risk analyses are possible. Depending on the phenomena to be evaluated, a corresponding weighting, similar to conventional signal analysis, can be used (for example, Pareto 80/20 analysis)

Other Examples

Some examples of how SOMs can be used in the condition monitoring of WEA are described below.

Detection of Sensor and System Faults

SOM graphs can be used, for example, to read out how efficiently a WEA has been operated or whether there were longer shutdowns with wind by the graphs of the wind speed and the graphs of the output of the WEA being examined. Thus, it can be read off at a glance by the graphs which are oriented in the same direction (same plant states for same SOM coordinates) where production was orderly or where the wind was strong and the plant did not produce any power. For example, if the appearance of the SOM graph of the power remains unchanged, but the wind speed signal appears unusual, a gradual failure of the wind sensor can be deduced. Similarly, based on the SOM graphs, faults in the system configuration, in the applets, in the cabling, possible transposition of the connections of the sensors for power and wind speed, etc., can be detected.

Evaluation of On-Site Conditions for the WEA and Detection of the Plant Characteristic If SOM frequency distributions and SOM graphs of identical WEA are compared among one another, good and bad plants can be identified at a glance and it can also be recognized relatively easily how the individual WEA behaves, for example, in phases of strong wind. In addition, from the SOM graphs of the wind speed and the power, site-dependent differences and mutual influences can be recognized, read off "at a glance" and the pertinent models can be trained.

If the rpm are added as a further observation and reference variable, the respective plant characteristic can be read off (rpm-fixed, rpm-variable, pitch-controlled, stall-controlled) or particulars in the plant control behavior can be recognized. Likewise, for pole-changing WEA it can be read off from the SOM graphs whether switching takes place properly and it can be evaluated via the number of hits whether switching may be taking place too often.

Evaluation of the Operating Behavior of WEA

If in addition to the SOM graphs of wind speed, power and rpm, SOM graphs of other operating, process and vibration quantities are also evaluated, and other plant characteristics and deviations from normal running and operating behavior can be recognized "at a glance". Thus, even performance monitoring of different WEA becomes possible, from which it is recognized, for example, that a wind power plant at low wind runs up at no load much more often than an adjacent plant. If CMS are in use which measure at the same time with higher measurement rates, these deviations appear not only after weeks, but also after a few days. Thus, a classical condition monitoring system can also be used for behavior and quality monitoring of plants of similar construction. The "sharpness" and the preferred information content of the graphs are parameterized beforehand by the specialist with reference to the application.

Evaluation of the General Vibration Behavior of the WEA

In VDI 3834, based on assessment vibration characteristics v and a, which are determined starting at 20% load, it is decided how good the running quality of the respective WEA is. If SOM graphs are used for "quality evaluation", even the entire working range with respect to the vibration quality can be monitored and evaluated "at a glance" with reference to the output. To do this in accordance with the invention a "masking" or a masking window could be set in order to derive operation-dependent characteristics. If deviations in the amplitudes of the graphs are established, it can be read off from the basic characteristic of the graphs in what state there is potential for improvement with respect to vibrations and resonances act, and/or the "machine comfort" can be improved. Or the vibration characteristics which are detected with a different measurement rate are compared in order to read off the dynamics and optionally the turbulences acting concomitantly on the vibration values. In the graphs dimensions based on vibration standards and nominal parameters are preferably used. The standardized version is possible, but unclear.

In the graphs, critical vibration ranges can be detected "at a glance" and their effect can be analyzed and evaluated in a manner specific to the component and to the direction. Mapping/windowing of the graphs become possible and can be compared for example, to FEM analyses.

Assessment of Rotary-Frequency Power Train Vibrations

In most power trains of WEA the rotary-frequency machine vibrations of the high-speed gearbox shaft, the output coupling and the generator are dominant. But, there are also power trains in which the tooth engagement frequency of the planetary stage is of the same order of magnitude as the rotary frequency of the high-speed shaft; this leads to more vibrations and also to more damage. Therefore, SOM graphs around the first order (0.8 to 1.2 order) are helpful. Fundamentally, power trains which are actually comparable should be identified via machine coding. Only then can good power trains be identified and also characteristic contour lines and patterns in SOM graphs be compared. Using pattern recognition the identification of the gearbox and generator manufacturer is also enabled. By using graphs it is also detectable that solid-born noise conduction to other power train components is taking place and that in some WEA types the gearboxes act predominantly in terms of vibration engineering.

Similarly the vibration specialist can analyze and evaluate tooth systems or other machine components "at a glance".

Assessment of Electrically Induced Vibrations

Figure 10:
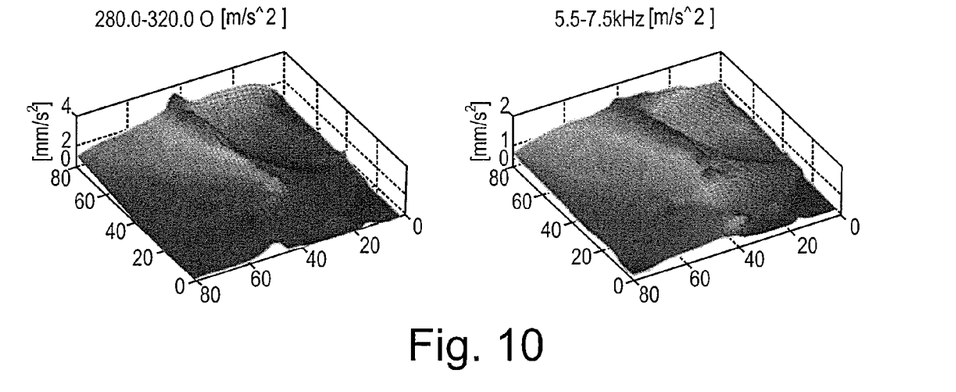
Figure 11:
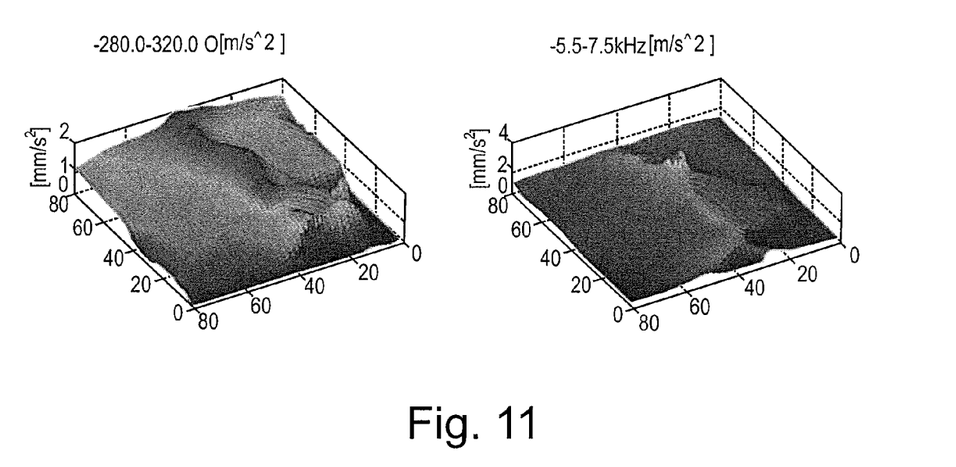

Using assessment accelerations, it can be analogously monitored whether the respective WEA is running in the range allowed by the standard and, for example, it can be analyzed using the frequency- and/or order-evaluated diagnosis characteristics how the converter and/or the generator is electrically behaving in terms of vibration engineering. Again, it is the vibration specialist who defines the necessary characteristics based on FMEA, activates the pertinent SOMs and then concludes what dominates when. FIGS. 10 and 11 show graphs of the order (at left; 280-320 order) and the frequency (at right; 5.5-7.5 kHz) which have been filtered for two different converter/generator combinations. A dominance in the order means that the generator dominates. Dominating excitations in the frequency are an indicator that the converter is dominating. In the right-hand illustration from FIG. 11, it can even be read off that only a narrow load range leads to more converter-induced additional vibrations.

Assessment of Bearing Excitations

By masking out electrically induced exciters in the accelerations, the diagnosis specialist creates the prerequisite for monitoring the energy content of the high-frequency vibrations in a dedicated manner for load-dependent and operation-dependent changes. This is used among others to detect a lack of lubrication, cavitation and advanced bearing damage. The procedure in accordance with the invention optionally makes it possible in addition to recognize, for example, incorrect floating bearing functions, excess lubrication, etc. In these fault phenomena, it must be considered that the two-stage SOM method in accordance with the invention makes it possible to avoid fault states being incorrectly trained as good conditions in level 1 SOM monitoring.

Assessment of the Low-Frequency Structure and Plant Vibrations

If the structure-dictated appearance of SOM graphs of comparable WEA at different measurement sites is compared to one another, for power trains which are running properly, similar SOM graphs can be read off. Only if deviations and plant malfunctions occur do the graphs and characteristics in the individual graphs change locally or altogether. Thus, useful level 1 SOM characteristics or groups of characteristics can therefore be best derived only when characteristic graphs exist.

Assessment of Low-Frequency Tower Vibrations (Tower Design)

Braced mast towers are distinctly more flexible than pipe towers; this can be made noticeable as a result of turbulence, both axially and also horizontally, at high wind speeds and for certain deviations in the mass unbalance and blade angles in more low frequency vibrations. However, to do this, it is necessary to use fewer averaged graphs in order to also take into account turbulence influences at the same time. Characteristics arise which can be recognized on the tower side and also on the rotor blade side in the SOM graphs of the low frequency vibrations "at a glance". If additional eigenfrequencies are excited, further amplitude rises occur which can also act locally. In this low frequency range, the rotor rotational frequency and/or the blade passage frequency can be excitory. It is characteristic, for example, for a braced mast tower that it "damps" vibrations better at partial load by more compliance.

Other variables which influence the low-frequency vibrations are the tower stiffness, the tower height and the gondola mass. Effects of the foundation, upwind and wave impact for offshore plants are likewise conceivable. Higher pipe towers or thinner-wall pipe towers are more flexible and are then similar in their structure to the braced mast towers. Concrete towers are much stiffer and can be likewise continuously monitored based on graphs. To monitor tower vibrations, the representation of, for example, the 0.01 to 0.06 order in the radially horizontal measurement direction and in the axial measurement direction is appropriate.

Recognition of Rotor Blade Types and of Rotor Blade Manufacturer

Rotor blade types can be recognized and classified by means of suitably filtered and/or averaged SOM graphs. This SOM evaluation also yields valuable information on rotor blade development and on the behavior for different winds and also allows conclusions regarding how turbulences are acting. It can likewise be taken into account that the rotor blades behave differently on braced mast towers and on pipe towers.

At this point, if the appearance of these SOM graphs changes over weeks, months or years, rotor blade damage can be deduced. Then, if the method is carried out directly with data from the rotor blades (regardless of what size), it can be monitored how the individual blade is behaving. Graphs which have been triggered on individual rotor blades are also possible. Then, only one additional phase transducer need be mounted for finding the rotor blade number.

Detecting and Distinguishing Rotor Blade Unbalance

Fundamentally, it can be distinguished between aerodynamic unbalance and mass unbalance. While the aerodynamic unbalance mostly acts in the axial direction, mass unbalance can be best detected in the radial direction. By comparing the SOM graphs which have been measured in the different directions, "at a glance" it can be more easily grasped how to distinguish between aerodynamic and mass unbalance and to monitor how the influence of turbulence/control is. Thus, the protection of rotors also becomes possible. Transient sensitivities can be recognized from the comparison. This example was discussed above in conjunction with FIG. 4.

Assessment of Vibration States and Mounting States of Generators

For this purpose, the vibration sum characteristics based on VDI 3834 and the vibration characteristics around the rotary frequencies of the generator can be represented, for example, for the A side and B side.

Assessment of Vibration States and Running States of Gearboxes

If the intention is to evaluate the vibration behavior and running behavior of gearboxes, in the first step, the sum vibration characteristics are used and they then pass as in conventional condition monitoring via characteristics and/or dominating frequencies or orders into the amplitude spectra of the respective gearbox. Thus, the gearbox diagnosis over the entire range of application is facilitated "at a glance" and the specialist can identify constraints, damage etc.

Detection of Alignment Deviations Between Gearbox and Generator

An alignment of two machine components which are coupled to one another is considered optimum when, under maximum load, low-vibration running behavior is present and the coupling equalizes the deviations free of constraint. In the wind branch it is conventional due to the power train components which are generally supported in a double-elastic manner that under partial load higher vibrations are acting due to the associated alignment deviations. For example, rotary frequency and double-rotary frequency vibration graphs for the generator can be prepared for analysis.

Detection of Additional Vibrations on the Power Train

Analyses of SOM graphs can be used to identify causes of increased vibrations.

Detection of Resonant Vibrations

For an unallowable resonance vibration, for example, each time the plant accelerates, increased vibrations can occur. This can then also be read off from the pertinent trajectory. These analyses require measurement engineering which measures quickly and at the same time.

Effect of Low-frequency Rotor Blade Vibrations and Rotor Unbalances on the Elastically Mounted Generator and the Elastically Mounted Gearbox For this purpose, for example, SOM graphs of low-frequency vibrations, measured over longer time intervals, at first in the radial measurement direction on the main bearing, then, on the generator A bearing and then on the generator B bearing, can be prepared. If the evaluation of the rotary-frequency vibrations is carried out similarly, the normal vibration behavior of the generator can be evaluated and compared. Disturbances include especially unbalances in the rotary-frequency vibrations. The resonance excitations can be identified especially easily at a glance. If the SOM graphs of the rotary frequency are compared to the SOM graphs of the vibration quality, a need for further deep analysis can be deduced for deviations. In these deviations the CMS could for example, also automatically take high-resolution additional measurements and store them separately in an internal bulk storage which is temporarily read out or replaced.

SOM Analysis of a Generator Failure

One example for sudden total damage on a generator is shown in FIGS. 7-11. Previously, the generator has been operated for roughly 6 months with high vibrations. The evolution of the failure can be recognized using SOM graphs of the vibration speeds which are selective with respect to order. In this example, it is conspicuous that presumably as a result of loosening phenomena only the low frequency characteristics and the overall characteristic on the A side have been strongly influenced, but the rotary-frequency and double-rotary frequency components to a lesser degree. Furthermore, additional "impacts" with damage appear.

With the invention, in condition monitoring and diagnosis, the alignment states, balance states, machine states, tooth system states and rolling bearing states can be evaluated and estimated via SOM graphs at a glance.

For example, conclusions can be drawn about wear parameters and component compatibility based on SOM graphs.

Effects of the structure, of the plant and of turbulence can be distinguished by different pretreatment of measured values and subsequent SOM evaluation.

Based on the U-matrix, decisions can be made about the usefulness of further deep analyses or additional after-treatments of measurement data.

Individual malfunction events can be checked by a monitor interrogation. To do this, the hits (number of events) and the amplitudes (for example, relative to VDI 3834) or set alarm and shutdown values are limited in order to avoid model distortions.

The phase boundaries of the U-matrix can be assigned to typical states and the weighting vectors can be equalized based on rated parameters.

According to one example, measurements are taken completely or in the event only when there have been changes in the quantization error and other SOM characteristics.

According to one example, weighting factors are established with respect to their dependencies or the underlying action chain is considered.

Depending on the machine type and plant type, sudden or abrupt events can be masked out by means of filtering, tailoring or other suitable algorithms.

Drive-side and output-side rpm characteristics can be compared SOM-based with respect to plausibility and deviations can be used as the diagnosis criterion.

Characteristic features can be monitored at different measurement points and compared for changes. This also reduces the fault tolerance or dependency on individual sensor faults.

SOM graphs can be compared to one another relative to the power and to the machine in order to deduce machine qualities and compare the same machines to one another and to configure them in the CMS.

SOMs can be configured depending on the useful signal. Start-up or transient states are treated according to a sequential algorithm and steady states are treated according to the batch algorithm.

Pre-trained models can run in the embedded system so that the amount of data can be perceptibly reduced.

The specialist can configure which phenomenon he intends to evaluate subsequently or online with which parameter by means of SOM data analysis. Moreover, the specialist defines other analyses depending on the signals.

In the SOM graphs, envelope bodies and/or envelope surfaces which describe warning states and alarm states can be formed, and after penetration, additional analyses can be automatically activated.

Amplitude SOM graphs and pertinent frequencies can be evaluated in order to be able to estimate expected degrees of damage and reductions of the service life. Thus, however, remaining service lives can also be estimated and predictions of remaining utility can be derived.

Turbulence actions and effects can be determined by comparisons of graphs which have been parameterized differently.

Selective vibration and diagnosis characteristics can be used in SOM graphs for systematic machine analysis and can be automatically monitored based on diagnosis/vibrations codings.

State variables, controlling variables, controlled variables, and operating variables can be used SOM-based to operate the plant in the optimum working range, and for deviations from the ideal state, operating modes can be adapted.

Unallowable operating regions can be avoided and/or masked out from SOM graphs.

Wind and stress profiles can be determined SOM-based and can be used for the configuration of comparable plants/parks.

Examples for Other Machines

This invention can be used to actively intervene into the process state and the operating state based on additional information which has been determined from multiple sensors so that the respective machine component can be used in its optimum working range. In particular, in the pertinent system the optimum operating points and operating modes can be recognized and used with operating behavior with as little vibration as possible.

This will be explained below using several examples:

Draglines

Draglines (also called scraper excavators) are, for example, excavators which are used in surface mining with buckets with volumes on the order of 10 m$^3$, in which vibrations can be advantageously monitored by means of the method in accordance with the invention. In this case, for example, resonance can be tracked by means of tracking of trajectories in SOMs. For example, the excavator arm with a full bucket has other resonances than in travelling with an empty bucket. For the vibration behavior what is important is not only the amount, but also the type of bucket contents. For example, ore has a different density than loam. The vibration behavior is furthermore also influenced by the direction of travel. When travelling to the truck with the bucket full the excavator arm also has a different resonant frequency than when travelling back with the empty bucket. Since in the monitoring of the excavator the direction of rotation is also included among the standard parameters, travelling to the truck and travelling back are on different trajectories, and thus, make different excavator arm resonances recognizable in the SOM.

Accordingly, it is useful if, for example, the amount of bucket contents (or the bucket volume), the type of bucket contents and the material to be excavated and the direction of travel loaded or empty are included in the system characteristic when the excavator is being classified by means of the system characteristic.

Ship Propulsion

Ship operators want ships to be driven efficiently and with low vibration and little maintenance, with as little fuel as possible. Ship propellers are optimized, additional guide apparatus are mounted to achieve improvements in efficiency and to avoid damaging cavitation. Furthermore, the internal combustion engine should run as much a possible at the optimum working point so that the highest efficiency is achieved. This can be done with permanent torque detection. But torque sensors are complex, expensive and therefore are rarely integrated on internal combustion engines.

Only in acceptance measures in the maritime sector are torque sensors used for power monitoring and for detection of rotary vibrations. Alternatively, attempts are made to determine this information for example, by coupling monitors.

Only for large ships with double propulsion are torque sensors being increasingly integrated. Here, they are used in ship operation only to achieve uniform sailing between port and starboard.

However, any ship structure, mode of sailing, cargo, wave height, wind direction, and flows has articular features which also act on vibrations. By proactive condition monitoring based on SOM the ship propulsion can be operated at its optimum operating point and it can be recognized when learned modes of sailing are also heralded by changes in the machine state.

Thruster Drives

Especially in drilling platforms must several thrusters provide for positions being maintained in high seas and regardless of wind directions. Since the thruster drives used are highly dynamically stressed and are also susceptible to damage, vibration-based condition monitoring is becoming increasingly common. Condition monitoring with SOM here can display, for example, deteriorations in machine running behaviors early so that accidents are avoided. Condition monitoring with SOM can also help here to find out whether the behavior of four or eight thrusters is actually efficient relative to one another. Both energy costs can be saved and also additional vibrations and additional stresses can be reduced by operating modes at the optimum working point.

Grinding Equipment

Especially vertical mills are used for grinding of different product qualities. In doing so, mill parameters are changed such that the desired fineness is achieved at maximum throughput. If overly high vibrations occur in the grinding process, it is either shut down or it is signaled based on torque measurements that operating behavior must be changed until stable running behavior is restored. If the vertical mill has variable speed, the disruptive effects continued to intensify. By proactive condition monitoring based on SOM, typical process states can be better recognized and readjusted earlier when deviations occur. Thus, the risk of unallowable stress on the drive is reduced; this in turn prolongs the service life. Moreover for the system manufacturer it becomes possible to sell more system throughput or to use payments based on system throughput.

Driving Machinery

If driving machinery is operated in the power boundary range, the normal wear is intensified. These wear-intensive boundary ranges can be present when the optimum operating temperature has not yet been reached or the rpm are too high or too low. Online particle size distribution counters deliver information about the current abrasion or the wear "floating in oil".

If particle size distributions are coupled to proactive condition monitoring based on SOM, regions with unwanted wear can be recognized and oppositely controlled even during operation.

Industrial Turbines

In turbines, during continuous operation, the shaft vibrations are monitored for the boundary values being exceeded. If deviations occur, orbit analyses are readily used to carry out corresponding deep diagnoses. Starting processes and rundown processes are evaluated by specialists only in special cases, with which valuable condition information is lost. With proactive condition monitoring based on SOM, starting processes can also be "learned" and transient operating states, once learned, can be compared model-based or established differences can be more easily recognized.

Pumps

Variable-speed pumps run the risk of moving into cavitation states or of running inefficiently. The broadband vibrations which arise during cavitation are one criterion for assignment of the cause in classical vibration diagnosis, but not unambiguously assignable. Thus each pump, depending on the medium and on its execution, also has its special vibration pictures. It is then the task of the diagnostic specialist to interpret the deviations which have been established with experience/results from comparable systems. This is tedious, expensive and requires comprehensive knowledge. In addition, it is more difficult that application-specific structural resonances and/or bearing damage in the same frequency ranges can likewise lead to additional spurious vibrations. But cavitation also means changes in the process variables such as, for example, more load fluctuations and pressure pulsations.

If the application-specific pump behavior is "learned", conventional working ranges can be assigned and monitored. If cavitation occurs or the pump approaches its phase boundary, it is possible to react earlier in the monitoring in accordance with the invention by means of SOM.

Fans

In particular, large fan installations are managed depending on the process, and the running and operating behavior differs, for example, between daytime and nighttime operation. Since variable-speed fans are preferred for reasons of energy, there is, of course, the risk that resonances will arise which lead to unwanted installation shutdown. In the lead article of Telediagnosis, number 11, "When the Furnace Ventilator Shuts Down" by Dr. E. Becker (see www.telediagnosis.com), it was reported how a rpm range with resonances was identified by laborious analysis effort and subsequently was masked out in the control system. With a proactive CMS based on SOM, unusual states such as, for example, disruptive axial vibrations can be identified early.

Hydroelectric Installations

Hydroelectric installations have different operating states which can be operated with rule-based condition monitoring and rule-based control. Interpretation of the pertinent shaft vibrations, however, typically requires a specialist who then balances the indicated changes in "detailed work" with process states. In proactive condition monitoring based on SOM, the typical operating and vibration states can be learned and then monitored with respect to changes depending on the operating class.

What is claimed is:

1. A method for monitoring of a rotary machine which is provided with a plurality of sensors for detection of physical parameters and is operated in variable operating states, the machine being a wind power plant, comprising the steps of:
   obtaining start sensor data in at least one basic operating state (A, B, C) of the machine;
   based on the start sensor data, setting up a knowledge-based starting model for the machine with a rule set for conducting the monitoring, the rule set determining which parameters are to be monitored in which manner and with which weighting and which sensor data are to be obtained and used for this purpose;
   preparing a reference self organizing map (SOM) using the rule set with sensor data which are selected using the rule set and which are obtained in a reference operating phase of the machine;
   during a monitoring operating phase, tracking the time characteristics of a quantization error of the sensor data which have been selected using the rule set with respect to the reference SOM;
   starting troubleshooting if the quantization error meets a criterion which is dictated by the rule set,
   using the rule set, at least one first diagnosis SOM with a subset of the sensor data which have been obtained in the monitoring operating phase being prepared with respect to at least one of the measurement instants, the number of sensors and sensor data obtained in the reference operating phase,
   preparing at least one 3D graph of the at least one first diagnosis SOM and evaluating the at least one 3D graph prepared using the rule set to identify a fault cause;
   if the identification of a fault cause from the evaluation of the at least one first diagnosis SOM is unsuccessful, preparing and evaluating at least one second diagnosis SOM with another subset of the sensor data which have been obtained in the monitoring operating phase with respect to at least one of the measurement instants, the number of sensors and sensor data obtained in the reference operating phase to identify a fault cause; and
   checking the starting model, and thus, the rule set, and if needed, modifying the rule set using evaluations of at least one of the at least one first and second reference SOMs and the at least one first and second diagnosis SOMs.

2. The method in accordance with claim 1, wherein for the evaluation of the diagnosis SOM(s), preparing a good condition SOM which corresponds to a respective diagnosis SOM is established with sensor data obtained during the reference operating phase of the machine and a 3D graph of the good condition SOM for comparison with the 3D graph of the diagnosis SOM using the rule set.

3. The method in accordance with claim 2, wherein an image processing algorithm is used for performing the comparison of the diagnosis SOM(s) with the good condition SOM.

4. The method in accordance with claim 2, wherein a 3D representation of the difference of the diagnosis SOM and a corresponding good condition SOM is prepared for evaluation of the diagnosis SOMs.

5. The method in accordance with claim 1, wherein the at least one diagnosis SOM comprises a plurality of diagnosis SOMs, and wherein, in the evaluation of the at least one diagnosis SOM, for each diagnosis SOM, a respective 3D graph is prepared for at least two parameters which are contained in the diagnosis SOM, the parameters being selected based on the rule set.

6. The method in accordance with claim 1, wherein a quantization error is taken into account in the evaluation of the at least one diagnosis SOM.

7. The method in accordance with claim 6, wherein the at least one diagnosis SOM selected has a quantization error above a certain threshold value.

8. The method in accordance with claim 1, wherein at least part of the sensor data is subdivided into at least two frequency bands using the rule set.

9. The method in accordance with claim 8, wherein the at least one diagnosis SOM comprises a plurality of diagnosis SOMs which differ from each other with respect to the frequency bands of the data at least of one of the sensors, which bands have been selected using the rule set.

10. The method in accordance with claim 9, wherein trajectories for at least one parameter of the diagnosis SOMs is tracked or analyzed into at least one diagnosis SOM.

11. The method in accordance with claim 1, wherein at least part of the sensor data is averaged in a time reference and the at least one diagnosis SOM is prepared with the values which have been averaged over time.

12. The method in accordance with claim 11, wherein at least part of the sensor data is averaged in several different time references and a separate diagnosis SOM is prepared for each time reference.

13. The method in accordance with claim 12, wherein at least the diagnosis SOMs which have been prepared on the basis of the time-averaged sensor data are compared to a diagnosis SOM which has been prepared based on corresponding unaveraged sensor data.

14. The method in accordance with claim 1, wherein the knowledge-based establishment of a starting model takes place using a FMEA method, using Markov graphs, using Petri networks or using a failure type analysis by means of a fault tree analysis (FTA) method.

15. The method in accordance with claim 1, wherein the knowledge-based establishment of a starting model takes place using a FMEA method and in the establishment of the starting model at least one of the following quantities is used:
  (1) a diagnosis priority number which is the product of the following index quantities: the severity of the effect of the occurrence of a certain fault with respect to the serviceability of the machine; expected machine-specific follow-up costs when a fault occurs; and the possibility of fault correction;
  (2) a vibration priority number which results from the product of the following index quantities: the frequency with which a predetermined vibration boundary value is exceeded; the severity of the effect of the vibration boundary value being exceeded with respect to the serviceability of the machine; and the probability of discovering the vibration boundary value being exceeded by means of the vibration detection system which is provided;
  (3) a risk priority number which results from the product of the following index quantities: the frequency with which the predetermined fault occurs in machine operation; the severity of the effect of the occurrence of the fault with respect to the serviceability of the machine; and the probability of discovering the occurrence of the fault by means of the diagnosis diagram used and the diagnosis system.

16. The method in accordance with claim 15, wherein the machine is subdivided into several components and for each of the components at least one of at least one diagnosis priority number, at least one vibration priority number, and at least one risk priority number is determined.

17. The method in accordance with claim 1, wherein the at least one reference SOM is modified with at least one part of the sensor data obtained during the monitoring operating phase in order to match the reference SOM to changes in the condition of the machine.

18. The method in accordance with claim 1, wherein all SOMs are initialized so that the same operating states in all SOMs are located in the same regions of the SOMs.

19. The method in accordance with claim 1, wherein a Gaussian function is chosen as an adjacency function of the SOMs.

20. The method in accordance with claim 1, wherein sensor measurement data are interpolated when necessary for purposes of comparability to other sensor measurement data in order to achieve the same time reference for all sensor measurement data.

21. The method in accordance with claim 1, wherein measured values which exceed a certain boundary value relative to an average of several measured values are not considered in the SOMs.

22. The method in accordance with claim 1, wherein only data contained in the SOMs are transmitted by means of long-distance data transmission to a service center located remotely from the machine in order to achieve a reduction of the transmitted data as compared to the sensor data which have been obtained.

23. The method in accordance with claim 1, wherein an alarm signal is sent to the service center when a quantization error of the at least on reference SOM meets a criterion which is dictated by the rule set.

24. The method in accordance with claim 1, wherein the detected parameters comprise wind speed, rpm and output of the wind power plant, and vibration characteristics which have been measured at different locations of the wind power plant.

25. The method in accordance with claim 24, wherein, for the at least one diagnosis SOM, certain vibration characteristics of certain components of the machine are selected using the rule set.

26. The method in accordance with claim 1, wherein the evaluation of the first diagnosis SOM(s) and/or of the second diagnosis SOM(s) takes place automatically by means of at least one image processing algorithm.

27. A method for monitoring of a plurality of rotating machines which are each provided with a plurality of sensors for detection of physical parameters and are operated in several variable operating states, the machines being wind power plants and the individual machines being cataloged by assignment of at least one of a plant characteristic relative to the type of components and the location of the respective machine, comprising the steps of:
  before commencement of monitoring of a selected machine, examining the selected machine and determining whether the plurality of the machines include another machine with the same plant characteristic a similar plant characteristic which differs by not more than a given value from the plant characteristic of the selected machine, and
  if another machine with the same or similar plant characteristic from the selected machine determined to be present, a starting model with a rule set for carrying out the monitoring which determines which parameters are to be monitored in which manner and with which weighting and which sensor data are to be obtained and used for this purpose is used that has been established knowledge-based on the foundation of start sensor data which have been obtained in at least one quasi-steady-state base operating state of the other machine, and either (a) reference self organizing map (SOM) is prepared using the rule set with sensor data which have been selected using the rule set and which are obtained in a reference operating phase of the selected machine;

or (b) a reference SOM of the other machine being adopted which has been prepared using the rule set with sensor data which have been selected using the rule set of the other machine and which are obtained in a reference operating phase of the other machine;

during a monitoring operating phase, a time characteristic of the quantization error of sensor data which have been selected using the rule set is tracked with respect to the reference SOM;

troubleshooting is started if the quantization error meets a criterion which is dictated by the rule set, in which using the rule set, at least one first diagnosis SOM with a subset of the sensor data obtained in the monitoring operating phase is prepared with respect to the measurement instants and/or the number of sensors and optionally with sensor data which have been obtained in the reference operating phase, at least one 3D graph of the at least one first diagnosis SOM is prepared and evaluated in order to identify a fault cause;

if an unambiguous fault cause is not determinable from evaluation of the at least one first diagnosis SOM, at least a second diagnosis SOM with another subset of the sensor data which have been obtained in the monitoring operating phase with respect to at least one of the measurement instants, the number of sensors and with sensor data which have been obtained in the reference operating phase is prepared and evaluated in order to identify a fault cause;

the starting model and thus the rule set are checked and modified as needed using evaluations of at least one of the at least one reference SOM and of the diagnosis SOMs;

for other machines with the same or similar plant characteristic as the selected machine, at least one of the starting model which has been modified as needed and a reference SOM with sensor data obtained in the monitoring operating phase is made available as the reference SOM.

28. The method in accordance with claim 27, wherein the plant characteristic specifies at least one of the following quantities: gearbox type, converter type, rotor blade type, generator type and tower type.

29. The method in accordance with claim 27, wherein the plant characteristic identifies a location of the plant with respect to adjacent wind power plants, the topography of the vicinity of wind power plants, and vegetation and development in the vicinity of the wind power plants.

* * * * *